United States Patent
Bilhe et al.

(10) Patent No.: US 10,144,099 B2
(45) Date of Patent: Dec. 4, 2018

(54) METHOD FOR ASSEMBLING TWO BLADES OF A TURBOMACHINE NOZZLE

(71) Applicant: SNECMA, Paris (FR)

(72) Inventors: Pascal Fabrice Bilhe, Le Coudray Montceaux (FR); Annie Pasquet, Longjumeau (FR)

(73) Assignee: SNECMA, Paris (FR)

( * ) Notice: Subject to any disclaimer, the term of this patent is extended or adjusted under 35 U.S.C. 154(b) by 117 days.

(21) Appl. No.: 14/913,004

(22) PCT Filed: Aug. 18, 2014

(86) PCT No.: PCT/FR2014/052097
§ 371 (c)(1),
(2) Date: Feb. 19, 2016

(87) PCT Pub. No.: WO2015/025105
PCT Pub. Date: Feb. 26, 2015

(65) Prior Publication Data
US 2016/0199950 A1    Jul. 14, 2016

(30) Foreign Application Priority Data

Aug. 20, 2013 (FR) .................................. 13 58083

(51) Int. Cl.
*B23P 15/00* (2006.01)
*B23P 15/04* (2006.01)
(Continued)

(52) U.S. Cl.
CPC ............ *B23P 15/04* (2013.01); *B23K 1/0018* (2013.01); *B23K 1/20* (2013.01); *F01D 9/044* (2013.01);
(Continued)

(58) Field of Classification Search
CPC ......... B23P 15/04; B23K 1/0018; B23K 1/20; B23K 2203/18; B23K 2201/001; F01D 9/044
See application file for complete search history.

(56) References Cited

U.S. PATENT DOCUMENTS

| 4,846,898 A * | 7/1989 | Natalie | C23C 22/68 |
| | | | 106/14.05 |
| 5,104,510 A * | 4/1992 | Moehle | C25D 5/026 |
| | | | 204/206 |

(Continued)

FOREIGN PATENT DOCUMENTS

| DE | 102 38 551 A1 | 3/2004 |
| EP | 2 484 475 A2 | 8/2012 |

(Continued)

OTHER PUBLICATIONS

International Search Report as issued in International Patent Application No. PCT/FR2014/052097, dated Nov. 26, 2014.

*Primary Examiner* — Richard Chang
(74) *Attorney, Agent, or Firm* — Pillsbury Winthrop Shaw Pittman LLP

(57) ABSTRACT

A method for assembling two blades of a turbomachine nozzle, includes positioning a first surface of a first blade and a second surface of a second blade facing one another, the first and second surfaces being spaced apart from one another by an assembly clearance, and vapor phase aluminizing the first and second surfaces so as to fill the assembly clearance.

9 Claims, 2 Drawing Sheets

(51) Int. Cl.
  *B23K 1/00*  (2006.01)
  *B23K 1/20*  (2006.01)
  *F01D 9/04*  (2006.01)
  B23K 101/00  (2006.01)
  B23K 103/18  (2006.01)
(52) U.S. Cl.
  CPC .... *B23K 2201/001* (2013.01); *B23K 2203/26* (2015.10)

(56) References Cited

U.S. PATENT DOCUMENTS 6,968,990 B2 * 11/2005 Ott .............................. B22F 9/28
  228/203
2009/0274562 A1 * 11/2009 Minor ..................... F01D 5/288
  416/241 R

FOREIGN PATENT DOCUMENTS

| FR | 1 433 497 A | 4/1966 |
| FR | 2 950 364 A1 | 3/2011 |
| GB | 2 133 104 A | 7/1984 |
| JP | S60-76292 A | 4/1985 |
| JP | 2003-105458 A | 4/2003 |

* cited by examiner

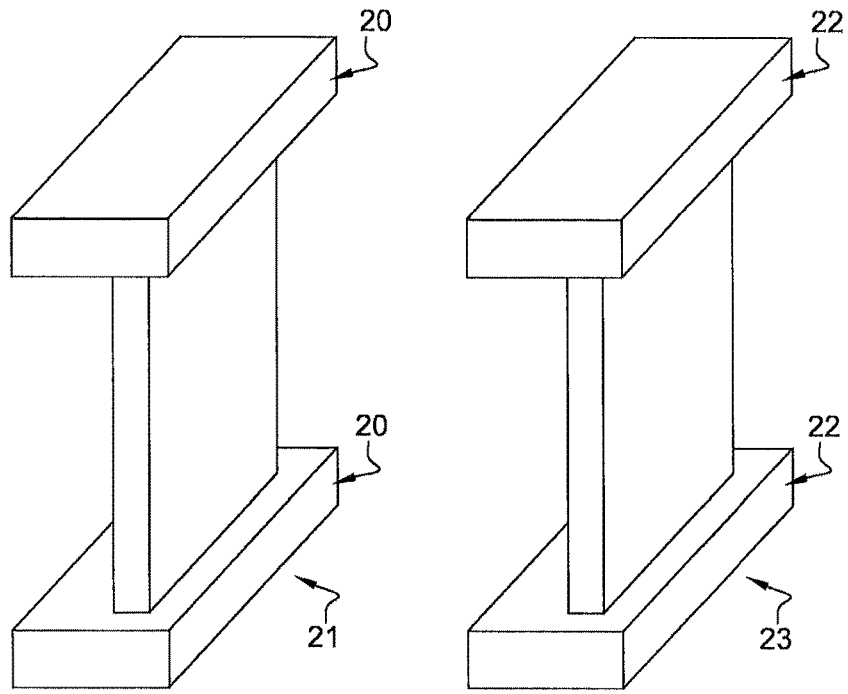
Fig. 1
Fig. 2
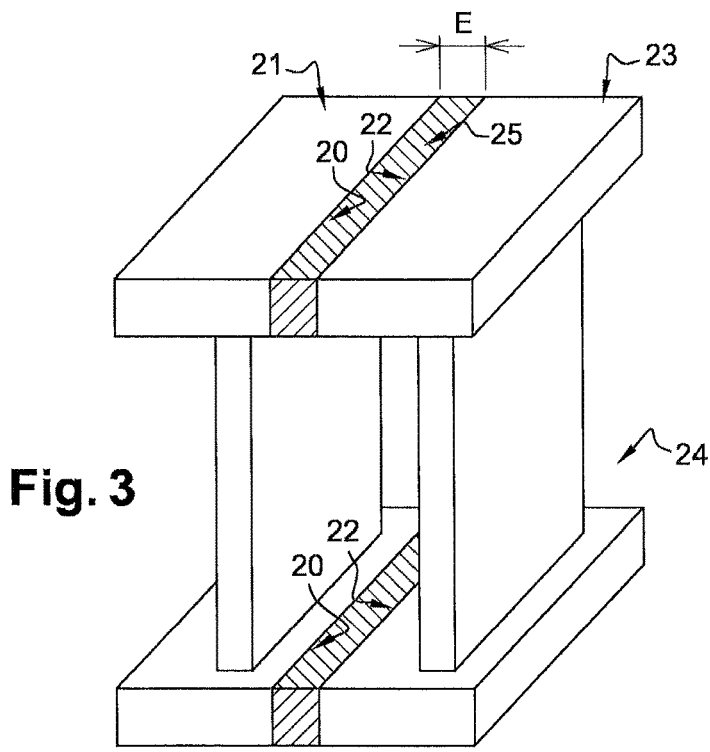
Fig. 3

METHOD FOR ASSEMBLING TWO BLADES OF A TURBOMACHINE NOZZLE

CROSS-REFERENCE TO RELATED APPLICATIONS

This is the U.S. National Stage of PCT/FR2014/052097, filed Aug. 18, 2014, which in turn claims priority to French Patent Application No. 1358083, filed Aug. 20, 2013, the entire contents of all applications are incorporated herein by reference in their entireties.

TECHNICAL FIELD OF THE INVENTION

The invention pertains to the general field of aeronautics. It relates to methods for manufacturing nozzle vanes, and more particularly methods for assembling two blades forming a nozzle.

TECHNOLOGICAL BACKGROUND OF THE INVENTION

Current foundry know-how does not enable a one-piece monocrystalline nozzle to be obtained. Thus, it is conventional to assemble two blades cast separately to form a nozzle. The assembly is generally carried out by a brazing/diffusion method, which is the most widely used method for the assembly of parts made of superalloy.

The brazing/diffusion technique consists in assembling parts, generally metal, using filler metal, in the form of powder or strip, placed between the parts to join together. The melting temperature of the filler metal is below that of the parts to join together. A first step, known as brazing, consists in subjecting the parts and the filler metal to a brazing temperature. The brazing temperature is determined such as to be below the melting temperature of the parts to join together. The increase in temperature to reach the brazing temperature is carried out in stages. The parts and the filler metal are then maintained at the brazing temperature for several tens of minutes. During brazing, an atomic diffusion takes place in a zone forming a brazed joint linking the two parts. A second step, called diffusion step, consists in carrying out a diffusion heat treatment in an oven, under controlled atmosphere for several hours, so as to assure sufficient homogenisation of the material situated at the level of the brazed joint.

In the light of the severe thermodynamic conditions to which the parts of a turbomachine are subjected in operation, the most suitable filler metal for assembling two blades is of composition NiCoSiB1060. The particularity of this filler metal is that it comprises silicon and boron which guarantee a good chemical bond between the blades to assemble.

However, a major defect of this component is the formation of zones of low mechanical and environmental resistances. Environmental resistance is taken to mean the capacity to withstand oxidation and corrosion. Yet, this type of both mechanical and environmental damage is very detrimental, leading to accelerated degradation of the brazed joint and leading to the disassembly of the two blades.

The rupture is generally located at less than one millimeter from the brazed joint, but rarely on the joint. This localisation is linked to diffusional phenomena on both side of the joint, which can exceed a hundred microns. The diffusion is notably exacerbated when the superalloy constituting the blades has grain joints, as is the case of polycrystalline superalloys.

GENERAL DESCRIPTION OF THE INVENTION

The invention offers a solution to the aforementioned problems, by proposing a method for assembling two blades, avoiding the formation of zones of low mechanical and environmental resistances.

The invention thus essentially relates to a method for assembling two blades of a turbomachine nozzle, comprising:
  positioning of a first surface of a first blade and a second surface of a second blade facing one another, said first and second surfaces being spaced apart from one another by an assembly clearance,
  vapour phase aluminising of the first and second surfaces, such as to fill the assembly clearance.

The method according to the invention comprises an aluminising step. The technique of aluminising is commonly used to protect parts from oxidation. This technique is well known, reference may in particular be made to the document FR1433497. It consists in placing the part to protect in a chamber in which circulates a gaseous mixture including a compound of aluminium, such as a halide, and a dilution gas or carrier gas. The halide is produced by reaction between a halogen, for example chlorine or fluorine, and a metal donor containing aluminium, for example a metal alloy of aluminium with one or more of the metal constituents of the material of the part to protect. The carrier gas assures the dilution and the driving of the gaseous mixture to bring the halide into contact with the part in order to form a deposit, a coating, on the surface thereof. The coating formed has the particularity of protecting from oxidation. It may be noted that the carrier gas commonly used is argon.

During the aluminising step, a homogeneous deposition of aluminium is formed on the first blade and on the second blade, and notably on the first surface and on the second surface. At the end of the aluminising step, the initial assembly clearance is filled by these deposits.

The method according to the invention thus enables chemical coupling between the blades, making the use of a filler metal comprising silicon or boron no longer necessary. Thus, the formation of zones of low mechanical and environmental resistances, due to boron or to silicon, is avoided.

Furthermore, an additional advantage is that at the end of the aluminising step, the nozzle, formed by the two blades assembled, is covered with an antioxidant coating.

Apart from the characteristics that have been mentioned in the preceding paragraph, the method according to the invention may have one or more additional characteristics among the following, considered individually or according to any technically possible combinations thereof.

In a non-limiting embodiment, the method comprises a step of implanting solder beads in the first surface and second surface, such as to maintain the positioning, between the positioning step and the aluminising step. In a non-limiting embodiment, said beads are constituted of nickel.

In a non-limiting embodiment, the method comprises a diffusion step, following the aluminising step. This makes it possible to avoid the formation of an over-stoichiometric aluminium phase. In fact, such a phase is fragile.

In a non-limiting embodiment, the method comprises a step of depositing a layer favouring aluminising. This layer is intended to favour the deposition of aluminium.

In a non-limiting embodiment, the layer is obtained by electrolytic route, for example of platinum or palladium.

In a non-limiting embodiment, the layer is obtained by physical vapour deposition.

In a non-limiting embodiment, the method according to the invention comprises a step preceding the positioning step: a surface treatment of the first and second surfaces. This surface preparation is intended to prepare and clean the first and the second surfaces in order to favour aluminising.

In a non-limiting embodiment, the surface treatment comprises degreasing the first and second surfaces with acetone under ultrasonic agitation.

In a non-limiting embodiment, the surface treatment comprises chemical dissolution of the surface oxides of the metals constituting the first and second blades.

In a non-limiting embodiment, the method comprises a step of masking at least one zone of the first blade, preceding the positioning step. This makes it possible to avoid deposition of aluminium on certain zones of the nozzle, for example at the blade root.

In a non-limiting embodiment, the method comprises a step of determining the assembly clearance, preceding the positioning step. In fact, the binder layer of aluminium must not be too thick, to avoid a reduction in the mechanical properties. It may be noted that the evolution of the deposited thickness as a function of the parameters of time, temperature and pressure, follows a parabolic law. The assembly clearance is of the order of several tens of micrometers.

The invention and its different applications will be better understood on reading the description that follows and by examining the figures that accompany it.

BRIEF DESCRIPTION OF THE FIGURES

The figures are only presented for indicative purposes and in no way limit the invention. The figures show:

In FIG. 1, a schematic representation of a first blade of a nozzle

In FIG. 2, a schematic representation of a second blade of a nozzle

In FIG. 3, a schematic representation of a nozzle formed of the association of the first blade of FIG. 1 and the second blade of FIG. 2

DETAILED DESCRIPTION OF AT LEAST ONE EMBODIMENT OF THE INVENTION

Figure 4:
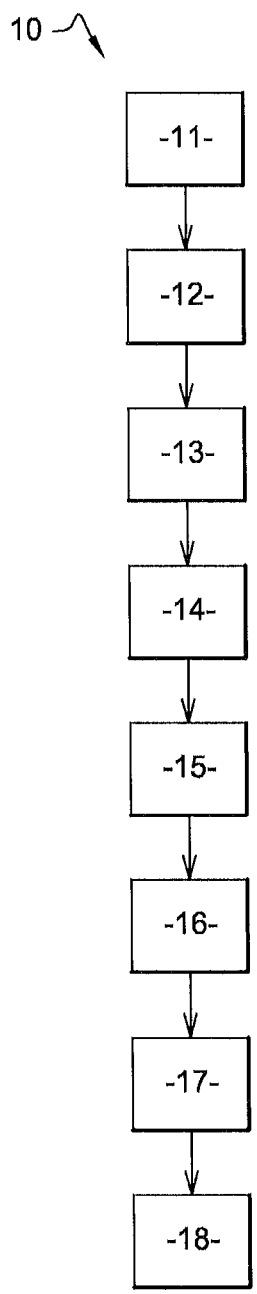
In FIG. 4, a schematic representation of the steps of a method for assembling according to a non-limiting embodiment of the invention.

Unless stated otherwise, a same element appearing in different figures has a single reference.

With reference to FIGS. 1, 2 and 3, the method according to the invention aims to assemble a first surface 20 of a first blade 21 and a second surface 22 of a second blade 23, in order to form a turbomachine nozzle 24, for example a nozzle of a high pressure turbine used in civil and military engines. The alloys commonly employed in high pressure and low pressure turbines are nickel based superalloys. However, the method according to the invention is also applicable to cobalt based superalloys.

The method implements a vapour phase aluminising step, as is detailed hereafter.

With reference to FIG. 4, the method 10 according to the invention comprises the following steps:
  according to a first step 11, masking at least one zone of the first blade 21 and/or one zone of the second blade 23. In fact, it is important to protect certain sensitive zones from the aluminising, for example a blade root. It may be noted that the first step is optional: it is not present in another embodiment of the invention. The masks used are metal elements covering certain zones and guaranteeing sealing to aluminising. Masks conventionally used in the prior art may be used because the temperature of vapour phase aluminising according to the invention is equivalent to that of conventional aluminising.

According to a second step 12, surface treatment of the first surface 20 and the second surface 22. The surface treatment serves to prepare the surfaces to assemble. The surface treatment comprises for example simple degreasing with acetone under ultrasonic agitation, or instead chemical dissolution of the surface oxides of the metals constituting the first and second blades 21, 23. Chemical dissolution comprises conditioning of the oxides in alkaline bath, followed by chemical activation by acid, then bleaching in alkaline bath. It may be noted that this second step is optional: it is not present in another embodiment of the invention. It may also be noted that in another embodiment, the second step 12 is carried out before the first step 11.

According to a third step 13, a deposition of a layer favouring aluminising. The deposition is for example obtained by electrolytic route of platinum or palladium or any other combination known to favour deposition of aluminium. The layer may also be deposited by physical vapour deposition, or take the form of a strip. It may be noted that the third step is optional: it is not present in another embodiment of the invention.

According to a fourth step 14, determination of an assembly clearance E, said assembly clearance E corresponding to the distance separating the first surface 20 of the first blade 21 and the second surface 22 of the second blade 23 when said first and second surfaces are positioned facing one another in order to undergo aluminising. The assembly clearance E is determined as a function of the material constituting the blades, the shape of the blades, the aluminising treatment conditions, etc. The assembly clearance E is of the order of several tens of micrometers, it is for example comprised between thirty and one hundred and fifty micrometers. The assembly clearance E is for example from forty to fifty micrometers, which is a usual order of magnitude retained for operations of brazing-diffusion for nickel based alloys.

According to a fifth step 15, positioning the first surface 20 of the first blade 21 and the second surface 22 of the second blade 23 facing one another, said first and second surfaces being spaced apart from one another by the assembly clearance E.

According to a sixth step 16, implanting solder beads in the first and second surfaces 20, 22, such as to maintain the positioning. In the case of nickel based superalloys, the beads are constituted of nickel. The number and the spacing between the beads depend on the shapes of the blades to assemble. This technology operates by storing the welding current in capacitors. The discharge of the capacitors releases the current in a very rapid pulse. It is thus possible to produce extreme welding currents of several 100 kA in an extremely short time lapse, which makes it possible in the case of nickel beads to melt them in order that said beads maintain in position the surfaces before assembly.

According to a seventh step 17, the vapour phase aluminising of the first and second surfaces, such as to fill the assembly clearance E. This step comprises the following sub-steps:

Placing the assembly formed of the first blade 21, the second blade 23, and beads, in a thermochemical installation. In this thermochemical installation, called chamber, circulates a gaseous mixture comprising an aluminium compound, such as a halide, and a dilution gas or carrier gas. The halide is produced by reaction between a halogen, for example based on chlorine and/or fluorine, and a metal donor containing aluminium, for example a metal alloy of aluminium with one or more of the metal constituents of the material of the part to protect. In an embodiment of the invention, the metal donor containing aluminium is of weight composition $CrAl_{20}$ or $CrAl_{30}$. In another embodiment of the invention, the donor is a ternary or quaternary cement as described in the document FR2950364. In this case, it is possible to obtain, in addition to aluminium, a doping with reactive elements (such as hafnium, zirconium, etc.) known as beneficial for oxidation resistance. In an embodiment of the invention, the halogen is fluorine and the halide produced is of composition $NH_4F$ or HF. In an embodiment of the invention, the halogen is chlorine and the halide produced is of composition $NH_4Cl$. In an embodiment, the dilution gas used is argon. In an embodiment, the partial pressure of argon in the chamber is of the order of 100 mBar. This pressure is advantageously a lower limit. It may be noted that it is important to find a compromise between the partial pressure of dilution gas (in Bars), the useful volume of the chamber (in $dm^3$), and the quantity of halide (in grammes), in order to optimise aluminising. In an embodiment, the operating ranges are comprised between $10^{-2}$ and 140 $g/Bar/dm^3$. More precisely, in an embodiment, the operating ranges are comprised between 0.1 and 20 $g/Bar/dm^3$.

A heat treatment of the assembly in the chamber. In an embodiment in which the third step is not carried out, the heat treatment is carried out for six hours at a temperature of 1100 degrees Celsius. In an embodiment in which the third step is carried out, the heat treatment is carried out for six hours at a temperature of 1080 degrees Celsius. These conditions of temperature and duration are not limiting. In another embodiment, the temperature is comprised between 950 and 1200 degrees Celsius. In another embodiment, the duration of the heat treatment is comprised between two and twelve hours. At the end of the heat treatment, a homogeneous deposit 25 of aluminium is obtained on the first surface 20 and the second surface 22, said deposit 25 filling the assembly clearance E. Thus, thanks to the deposit 25, the two blades 21, 23 are assembled.

According to an eighth step 18, a diffusion treatment in order to avoid the formation of a phase of nickel aluminide in over-stoichiometric quantity, which is fragile. In an embodiment, the diffusion treatment is carried out under vacuum, at a temperature of 1100 degrees Celsius, for a duration of one hour or more. It may be noted that this eighth step is optional, it is not present in another embodiment of the invention.

The method thus consists in assembling the blades during the formation of a coating of nickel aluminide. This type of assembly has interesting characteristics in terms of mechanical resistance and in terms of oxidation resistance.

The invention claimed is:

1. A method for assembling two blades of a turbomachine nozzle, comprising:
    positioning a first surface of a first blade and a second surface of a second blade facing one another, said first and second surfaces being spaced apart from one another by an assembly clearance;
    implanting solder beads in the first and second surfaces so as to maintain a positioning between the positioning step and the aluminising step, and
    vapour phase aluminising the first and second surfaces so as to fill the assembly clearance.

2. The method for assembling according to claim 1, further comprising a diffusion step, following the aluminising step.

3. The method for assembling according to claim 1, further comprising depositing a layer favouring aluminising, preceding the positioning.

4. The method for assembling according to claim 3, wherein the layer is obtained by electrolytic route.

5. The method for assembling according to claim 3, wherein the layer is obtained by physical vapour deposition.

6. The method for assembling according to claim 1, further comprising performing a surface treatment of the first and second surfaces, preceding the positioning step.

7. The method for assembling according to claim 6, wherein the surface treatment comprises degreasing the first and second surfaces with acetone under ultrasonic agitation.

8. The method for assembling according to claim 1, further comprising masking at least one zone of the first blade, preceding the positioning step.

9. The method for assembling according to claim 1, further comprising determining the assembly clearance, preceding the positioning step.

* * * * *